Oct. 27, 1936.  H. A. LOCKWOOD  2,058,807
BAKING PAN UNIT
Filed Feb. 11, 1935

Inventor
Harry A. Lockwood

By Murray and Zugelter
Attorneys

Patented Oct. 27, 1936

2,058,807

UNITED STATES PATENT OFFICE 2,058,807

BAKING PAN UNIT

Harry A. Lockwood, Cincinnati, Ohio, assignor to The Lockwood Manufacturing Co., Cincinnati, Ohio, a corporation of Ohio Application February 11, 1935, Serial No. 6,046

7 Claims. (Cl. 53—6)

This invention relates to a set or unit of baking pans of the type commonly used in bakeries for producing baked loaves and the like in large quantities.

An object of the invention is to provide a baking pan unit having means associated therewith for effecting solid non-shifting nesting or stacking of a plurality of units when they are stored.

Another object is to provide supporting and stacking means of the kind described which likewise serve as a protecting media for the corners of the pan units.

Another object is to provide means for supporting one unit in nested relationship with another, said means being adapted to minimize contact of the one unit with another whereby wearing, abrasion, and distortion of the units may be obviated.

Another object is to accomplish the results described by peculiarly efficient and simple construction.

These and other objects are attained by the means described herein and illustrated in the accompanying drawing in which.

Heretofore the storage of large numbers of baking pan units has involved this difficulty, that when the units were nested or built up beyond a comparatively limited height, the looseness and play between the various units of one stack resulted in non-alignment of the stack, especially if the stack were bumped or in any way disturbed, so that the stack toppled over, causing a loss of time and effort. In addition to the foregoing, it has been common to provide a baking pan unit with strap means that extend around the periphery of the unit and adapted to rest upon the top edges of the lower pan unit into which the associated unit might be nested. This frictional contact of the lower edge of the strap means with the top edge of an embracing unit resulted in deterioration of the top edges of said lower unit whereby the useful life of the pans was shortened. The present invention avoids both of the above difficulties and others of a related nature, by providing at spaced intervals around the lateral periphery of a pan unit, a plurality of foot members adapted to rest upon the lower edges of a subjacent unit for precluding looseness and intershifting of the two units when so nested together. Furthermore, these foot members, when associated with strap means such as herein illustrated, are adapted to hold the lower edges of the strap means of an upper unit out of contact with the upper edges of the pans beneath so that deterioration of the later by such contact is obviated.

Other advantages of structure and function will appear throughout the following description.

Figure 1:
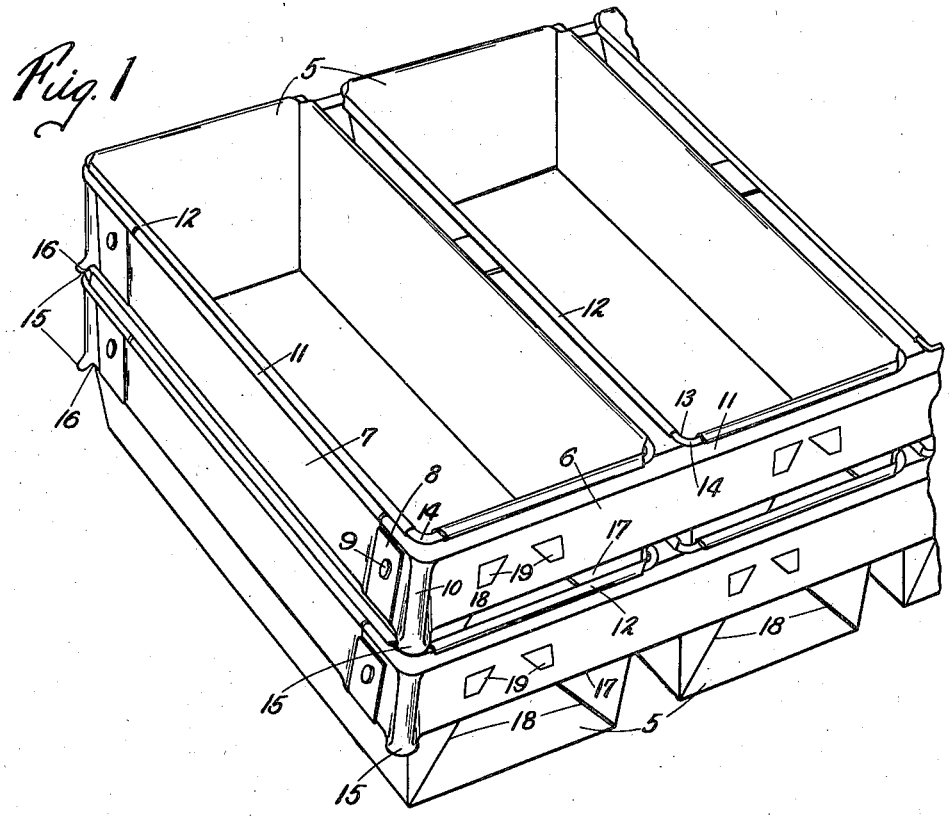
Fig. 1 is a perspective view with parts broken away of two baking pan units of the present invention shown in nested relationship.

In greater detail and with reference to the drawing, a pan unit as contemplated by the present invention may comprise a plurality of substantially rectangular pans 5 connected in spaced parallel relationship. Strap means embracing the sides and ends of the unit adjacent the top thereof, may be provided and may comprise the elongated straps 6 extending along the ends of the pans of the unit and the shorter strap sections 7 extending along the outer sides of the end pans of the unit. It will be seen in Fig. 1 that the straps 6 are turned about the corners of the pan unit and, adjacent the corners of the unit, have their extreme turned ends overlapped as at 8 by the ends of the shorter strap sections 7, these parts being suitably connected such as by rivets 9. The elongated strap means 6 may be connected to the end of each pan of the unit by suitable means such as lugs struck inwardly from the body of the strap and projecting beneath the end folds 18 of the pans as indicated at 9, which connection structure is well understood and need not be further elaborated. At the corners of the unit, the straps 6, where they are turned about the associated pans, are formed with integral loop members 10 extending vertically of the strap and which loop members project outwardly of the corners of the pan for serving, under one aspect, as bumper members for protecting the corners of the unit against distortion. With further reference to Fig. 1, it will be observed, that the upper portions of the straps 6 and 7 may be formed into beads 11 which are disposed immediately beneath the wire-rolled top edges 12 of the adjacent pan edges. In connection with these wire-rolled edges 12, it will be noted that, in accordance with common practice, the material of each pan, at the top corners thereof is notched as at 13 whereby the wire 14, upon which said edges are rolled is exposed at these points.

The supporting and nesting means illustrated in Fig. 1 herein comprise foot members 15 each of which may be formed by an outward and downward extrusion of the lower end of the ribs or bumpers 10. The result of this structure is to provide a kind of crotch 16 adapted, when one unit is nested upon another, to rest upon and embrace the exposed wire portions 14 of the subjacent unit. It will be seen that the foot members 15 extend well down over said wires so that a firm and substantial hold of the upper unit upon the lower is effected. The result is to assure a solid and efficient stack of the units to the end that a great number of them may be stored in nested relationship without danger of the stacks toppling over or assuming such positions that slight contact therewith would displace the stack.

Fig. 1 likewise illustrates the function of the foot members 15 in holding the lower edges 17 of the strap means of one unit out of frictional contact with the upper edges 12 of the underlying or support unit so that abrasion and distortion of the latter are effectively obviated. The foregoing result will be readily understood since it is obvious that the foot members 15 project into a plane lower than that of the bottom edge of the associated strap means.

Figure 2:
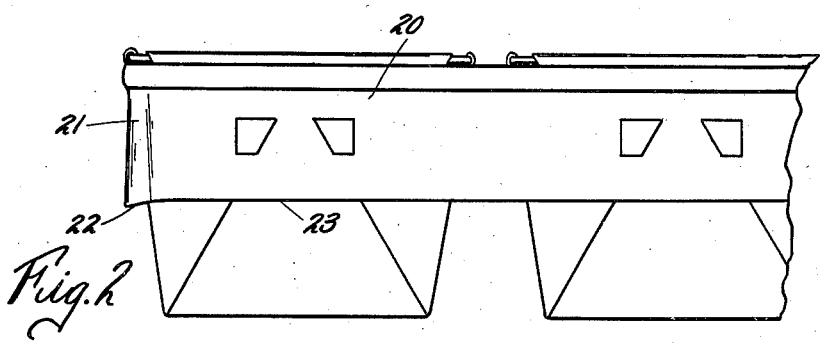
Fig. 2 is a fragmental end view of the baking pan unit comprising a modified form of corner support means.

Fig. 2 illustrates a modified form of supporting foot member. In this instance, the elongated strap means indicated at 20 may be similar in form and in connection to the pans with the strap means above described. The corner bumper or ribs 21 are likewise, for the most part, similar to those of the foregoing description with the exception that the foot 22 formed at the lower end of the rib 21 is not of the flared or crotched type, nevertheless it has its lower edge disposed in a plane slightly below the lower edge 23 of the strap means 20 so that said lower edge 23 is held out of contact with the top edges of the other unit into which the associated unit might be nested, in the manner of Fig. 1. This type of foot member would be preferably for use where the stacking of a comparatively small number of units is contemplated and in such instances where the problem of stacks of great height becoming displaced or toppled does not present itself. The foot members 22 do, however, provide a simple and efficient means for precluding frictional wearing contact by the associated strap means, as already described.

It is apparent that the foot members disclosed herein may, if desired, be associated with a single pan only so that a stack of pans so constructed may possess the same solidity of positioning as the units described above.

Various modifications suggest themselves upon consideration of the means herein disclosed but these are believed to be comprised within the spirit and scope of the present invention.

What is claimed is:

1. A baking pan unit comprising a plurality of substantially rectangular pans connected in parallel relationship, a strap embracing the sides and ends of the unit and provided at each corner of the unit with an outwardly projecting vertical rib, and a foot member at the lower end of each rib and extending into a plane lower than that of the bottom edge of said strip, said foot members being adapted each to rest upon and embrace a corner of another pan unit upon nesting of the one unit into the other, for supporting the upper unit and for precluding wearing contact of the lower edge of the strap thereof upon the upper pan edges of the supporting unit.

2. A baking pan unit comprising a plurality of substantially rectangular pans connected in parallel relationship, a strap embracing the sides and ends of the unit and provided at each corner of the unit with an outwardly projecting vertical rib, and an outwardly and downwardly extending foot member provided at the lower end of each rib and adapted to rest upon and embrace a corner of another pan unit upon nesting of the associated unit thereinto for supporting the one unit upon the other and for obviating looseness and intershifting of a plurality of the units when stacked.

3. A baking pan unit comprising a plurality of connected pans, and a plurality of outwardly-projecting foot members attached to the lateral portions of the unit in spaced relationship around the periphery thereof and lying in a common plane, said foot members, upon nesting of the one unit into another being adapted to rest upon and embrace the top edges of the lower unit for supporting the upper unit thereon.

4. A baking pan unit comprising a plurality of connected pans, and a plurality of outwardly and downwardly extending foot members attached to the lateral portions of the unit intermediate the top and bottom edges thereof, said foot members being disposed in spaced relationship around the periphery of the unit and lying in a common plane, the foot members upon nesting the one unit into another being adapted to rest upon and embrace the top edges of the lower unit for supporting the upper unit upon the lower and for obviating looseness and intershifting of a plurality of the units when stacked.

5. A baking pan unit comprising a plurality of substantially rectangular pans connected in parallel relationship, a strap means embracing the sides and ends of the unit adjacent the upper portions thereof, said strap means being formed at the corners of the unit with integral loop members providing a vertical outwardly projecting rib at each corner of the unit, and an outwardly and downwardly extending foot member formed at the lower end of each rib and adapted to rest upon and embrace a corner of another pan unit upon nesting of the associated unit thereinto for supporting the one pan unit upon the other and for obviating looseness and intershifting of a plurality of the units when stacked.

6. A baking pan unit comprising a plurality of substantially rectangular pans connected in parallel relationship and each formed with a wire-rolled top edge, the wire being exposed at the corners of each pan, strap means embracing the sides and ends of the unit adjacent the upper portions thereof and formed at each corner of the unit with an integral loop portion providing a vertical outwardly projecting rib, and an outwardly and downwardly projecting foot member formed at the lower end of each rib and all lying in a common plane intermediate the top and bottom edges of the pan unit, said foot members being adapted when the pan unit is nested into a similar unit to rest upon and embrace the exposed wire portions at the corners of the lower unit whereby the upper unit may be supported upon the lower in non-abrading contact with the upper edges of the lower pans, said foot members likewise being adapted to preclude wearing contact of the lower edge of the strap means on the upper unit with the upper edges of the lower unit and being further adapted to obviate looseness and intershifting of a plurality of the units when stacked.

7. A baking pan having a plurality of outwardly and downwardly projecting foot members attached to the lateral portions of the pans intermediate the top and bottom edges of the pan, said foot members being adapted, when the pan is nested into another similar pan, to rest upon and embrace the top edges of the lower pan for supporting the upper pan thereon and for obviating looseness and intershifting of a plurality of the pans when stacked.

HARRY A. LOCKWOOD.